United States Patent [19]

Matsui et al.

[11] 4,045,311

[45] Aug. 30, 1977

[54] PROCESS FOR MAKING A MINUTE HOLE

[75] Inventors: Masao Matsui, Nagoya; Atsunobu Murata, Aichi; Masami Isii; Hiromu Komai, both of Toyota, all of Japan

[73] Assignees: Kabushiki Kaisha Toyota Chuo Kenkyusho, Nagoya; Aisin Seiki Kabushiki Kaisha, Kariya, both of Japan

[21] Appl. No.: 727,695

[22] Filed: Sept. 28, 1976

[30] Foreign Application Priority Data

Sept. 30, 1975   Japan .............................. 50-118675

[51] Int. Cl.² .............................. C25F 3/02; C25F 3/04; C25F 3/06
[52] U.S. Cl. .............................. 204/129.55; 204/129.35
[58] Field of Search .............................. 204/129.35, 129.55, 204/224 M, 224 R

[56] References Cited

U.S. PATENT DOCUMENTS

| 2,476,965 | 7/1949 | Emerson et al. | 204/129.55 |
| 2,496,299 | 2/1950 | Mansfield et al. | 204/129.35 |
| 3,325,384 | 2/1967 | Frantzen | 204/129.55 |

*Primary Examiner*—John H. Mack
*Assistant Examiner*—D. R. Valentine
*Attorney, Agent, or Firm*—Berman, Aisenberg & Platt

[57] ABSTRACT

An inexpensive process for making a minute circular hole having a smooth peripheral edge in a thin wall of a metal article. A depression is formed on one surface of the wall so as to simultaneously form a projection on the other surface thereof. The apex of the projection is positioned in a spaced relationship to a cathode in an electrolyte. An electric current is then introduced between the projection, which serves as an anode, and the cathode, which acts to selectively and anodically dissolve the apex of the projection so as to form a minute hole in the wall.

8 Claims, 4 Drawing Figures

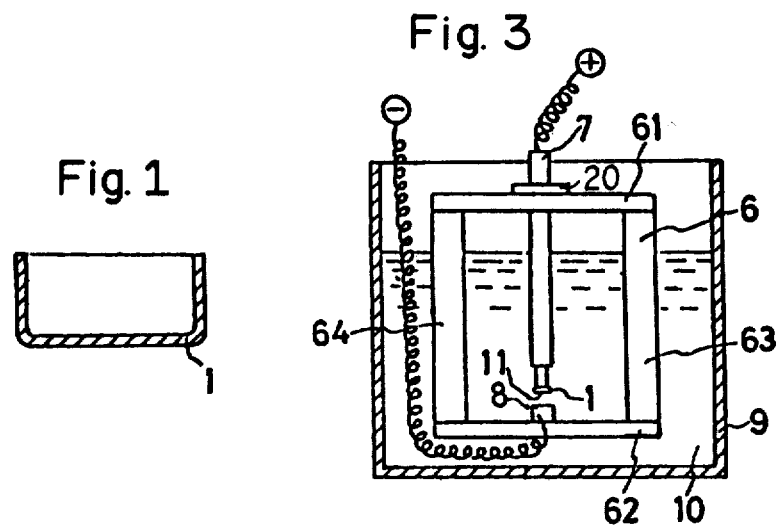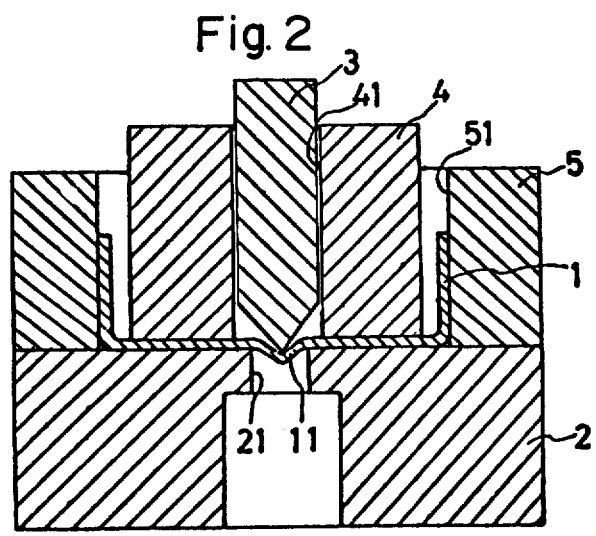

4,045,311

PROCESS FOR MAKING A MINUTE HOLE

BACKGROUND OF THE INVENTION

1. Field of the Invention

This invention relates to a process for making a minute hole in a wall of a metal article such as thin sheet metal.

2. Description of the Prior Art

There presently exists many processes for forming a minute hole in thin sheet metal. Such prior art processes include, for example, electro-discharge machining, electron beam machining, and laser beam machining.

However, such processes necessitate the use of costly equipment and/or are inefficient in operation. For example, in electro-discharge machining, wherein a minute hole is formed in a thin wall directly by an electrode, high electrode consumption is an expensive problem. The electron beam machining technique suffers from poor operational efficiency in that the machining must be performed in a vacuum. The laser beam machining process obviously requires very expensive equipment. Hence, the foregoing techniques lead to low efficiency in operation, and thus an increase in the unit cost of forming a minute hole.

OBJECTS AND SUMMARY OF THE INVENTION

It is therefore a primary object of the present invention to provide a new and improved process for making a minute hole in a wall of a metal article, such as thin sheet metal.

Another object of the present invention is to provide a new and improved process for making a minute hole of a circular shape and having a smooth peripheral edge in a wall of a metal article.

A further object of the present invention is to provide a new and improved process for making a minute hole of a desired diameter in a wall of a thin metal article.

A still further object of the present invention is to provide a new and improved process for making a minute hole having a true circular shape in a wall of a metal article which may be inexpensively implemented on a mass production scale.

The foregoing and other objects are attained in accordance with one aspect of the present invention through the provision of a process for making a minute hole in a thin wall of a metal article on a mass production scale at a low manufacturing cost. The process of the present invention, preferably performed on the wall of a metal article having a thickness of not more than 0.3 mm., comprises the steps of forming a depression at a localized spot on one surface of the wall, the depression preferably having a depth exceeding the thickness of the wall. The formation of the depression acts to form a projection having an apex on the other surface of the wall. The projection thus formed is then placed in a spaced relationship to a cathode in an electrolyte, with the apex of the projection opposed to the cathode, and with the projection itself serving an an anode. An electric current is then introduced between the cathode and anode until the apex of the projection has been dissolved anodically and a minute hole is formed in the wall.

BRIEF DESCRIPTION OF THE DRAWINGS

Various objects, features and attendant advantages of the present invention will be more fully appreciated as the same become better understood from the following detailed description thereof when considered in connection with the accompanying drawings, in which:

FIG. 1 is a side-sectional view of a cup to be treated according to an example of the preferred mode of effectuating the process of the present invention;

FIG. 2 is a side-sectional view of a press-forming device which may be utilized in performing the process according to the present invention;

FIG. 3 is a diagrammatic illustration, in partial section, of an anodic dissolution apparatus which also may be utilized in performing the process of the present invention.

DETAILED DESCRIPTION OF THE PREFERRED EMBODIMENTS

Figure 4:
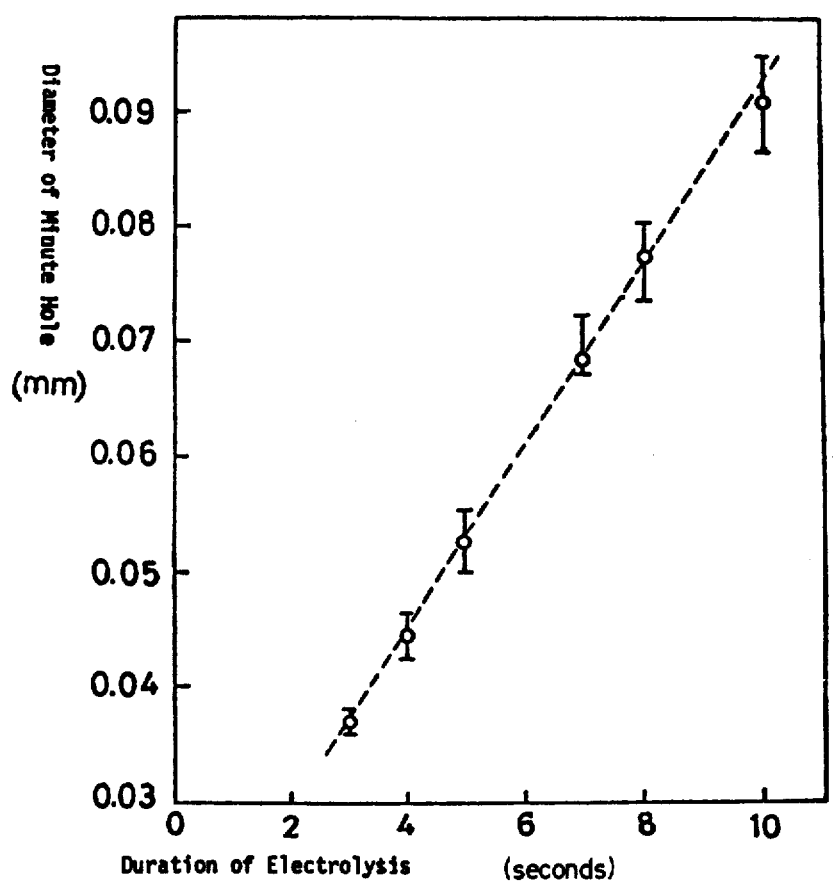
FIG. 4 is a graph showing the relationship between the diameter of the minute hole formed and the duration of electrolysis in accordance with the present inventive technique.

The process of the present invention is preferably applicable to thin metal articles, such as sheet metal which has a thickness of not more than 0.3 mm. The process of the present invention may be applied to various kinds of metal, such as steel, aluminum, stainless steel, or the like, but is particularly applicable to those metal articles which may be subjected to plastic forming and electrochemical machining.

According to the first step of the process of the present invention, a wall of a metal article is pressed at a localized spot on one surface thereof to form therein a depression having a depth preferably exceeding the article's wall thickness, whereby a projection having an apex will be simultaneously formed on the other surface thereof.

Many methods are known for forming such depressions, such as, for example, pressing the metal with a conical punch having a tip angle between 30° and 90°, or impacting a minute ball or a high pressure fluid against the wall of the metal article. It is preferable that the apex of the projection thus formed be of a conical shape and also be of a reduced thickness.

However, it is increasingly difficult to obtain a minute hole of the desired diameter as the shape of the apex of the projection is changed from a conical shape to a spherical shape. The depth of the depression, whose shape is complementary to that of the projection formed on the other surface of the wall, should be greater than the thickness of the wall. In other words, the bottom of the depression should be positioned beyond the plane that includes the back surface of the wall. If such a requirement is not fulfilled, then it is difficult to obtain the desired minute hole, even if the projection is then subjected to selective anodic dissolution in subsequent electrochemical machining.

It is important in the first step of the process of the present invention to make the apex of the projection thin, but not to the extent that the projection is broken. Such a reduced unbroken thickness may be readily obtained in the first step of the process of the present invention. This is achieved by selecting the optimum shape of a punch, and the optimum pressing technique, in order to obtain an extremely thin thickness of the apex of the projection.

More specifically, it has been found, according to the present invention, that the thickness of the apex of the projection in a wall may be reduced from 15% to 30% of that prior to the formation of the projection. The aforesaid reduced thickness of the apex portion of the projection formed in the metal wall facilitates the successful performance of the remainder of the present inventive technique, which may be broadly described as preparing a minute hole at the apex by anodic dissolution. It should be noted that if the apex portion is broken during the first step, a saw tooth edge may be undesirably formed, thus preventing the formation of a hole having a true circular shape. For this reason, care should be taken to prevent such breakage in the apex portion of the projection formed in the wall.

The wall of a metal article having a projection formed according to the first step of the present invention is then subjected to anodic dissolution. A well-known electrochemical machining process may be used to perform the anodic dissolution. More specifically, the wall of the metal article to be worked is immersed in an electrolyte, with the apex of the projection in the wall being positioned adjacent to a cathode for selective anodic dissolution resulting from introduction of an electric current. In electrochemical machining, an electric current selectively flows across an anode and a cathode through a gap defined therebetween, so that the anode is selectively subjected to anodic dissolution. In the present invention, the apex of the projection serves as the anode which is itself anodically dissolved. The apex of the projection is preferably positioned closer to the cathode than the other parts of the metal wall so that the current flow will cause selective anodic dissolution at the apex of the projection to thereby provide the desired minute hole in the wall.

It may be appreciated that it is not necessary to use a pointed cathode in the present technique. For example, a rod shaped material having a flat tip will be quite sufficient for use as the cathode.

Further, since the anodic dissolution begins from the apex of the projection, the amount of dissolution, which will define the size of the minute hole, may be controlled by varying either the time of anodic dissolution or the electric current. For example, when the current density is held constant, a minute hole having a larger diameter can be obtained by prolonging the treatment time. The anodic dissolution provides a nearly smooth dissolution surface, so that a minute hole having a smooth peripheral edge in the shape of a substantially true circle may be obtained.

A conventional electrolyte may be selected for the electrochemical machining in accordance with the material of the article being worked. An aqueous solution of an inorganic acid may be used in general for this purpose. Also, electroconductive materials such as iron, carbon or the like may be used as cathodes.

The following example is illustrative of the features of the process according to the present invention.

By way of example, and with reference to FIG. 1 of the drawings, 18–8 stainless steel having a thickness of 0.1 mm. was used for forming a cup 1 having an outer diameter of 4.5 mm. and a height of 2 mm. Then, a minute hole having a diameter of 0.04 to 0.09 mm. was made in the center of the bottom wall of cup 1.

According to the first step of the present invention, a projection forming machine may be used for forming a projection at the center of the bottom wall of the cup 1. A typical machine which may be used in this phase of the present invention is shown in side-section in FIG. 2. The projection forming machine therein illustrated comprises a cylindrical die 2 which has a centrally-formed bore 21 having a diameter of about 0.5 mm., a cylindrical punch 3, which has a tip angle of about 45°, a tubular holder 4 having a bore 41 centrally formed therein for receiving the punch 3, and a tubular guide 5 having a central bore 51 of a diameter of about 4.5 mm. which is sufficient to accomodate the outer diameter of the cup 1 mounted on the die 2. The cup 1 is placed in bore 51 of guide 5, and is then mounted on die 2, with the undersurface of cup 1 contacting the top surface of die 2. The holder 4 is then placed in cup 1 such that the bottom portion of cup 1 is held under pressure between die 2 and holder 4. The punch 3 is then inserted into bore 41, and a load is applied to punch 3 so as to form a projection 11 in the center of the bottom wall of the cup. The projection 11 may have, for example, a depth of about 0.15 mm. and an outer diameter of about 0.5 mm., as measured from the root of the projection. The wall thickness of the projection 11 in its apex portion was, in a particular example, about 0.02 mm., which corresponds to about 1/5 of the wall thickness (0.1 mm.) prior to formation of the projection.

Referring now to FIG. 3, there is illustrated an anodic dissolution apparatus which may be utilized to perform the electrochemical machining step of the present invention. The apparatus comprises an anode 7 and a cathode 8 which are secured to a supporting member 6 in an insulating manner. The cup 1 is fitted on the tip portion of the anode 7. The supporting member 6 is then immersed in an electrolyte 10 within a container 9, while a given amount of electric current is introduced from an external electric power source (not shown) for selective anodic dissolution of the apex of projection 11 formed on the cup 1. The supporting member 6 is preferably entirely comprised of a non-electroconductive material, and comprises an upper plate 61, a lower plate 62, and two side bars 63 and 64, thereby providing a substantially rectangular frame construction. A bore is formed in the center of upper plate 61 so as to receive the anode 7 therethrough.

A cylindrical stainless steel cathode 8, which may be, for example, 6 mm. in diameter and 15 mm. in height, is positioned in the center of lower plate 62 in an opposing relationship to the bore formed in the upper plate 61. The cathode 8 is connected to the negative terminal of an external electric power source. The anode 7 is provided in the form of an elongated rod having a flange 20 positioned about its upper portion. The lowermost end of anode 7 has an outer diameter which is substantially equal to the inner diameter of the cup 1, so that the cup 1 may be firmly retained by the lower end of the anode 7 due to frictional contact therebetween.

The position of flange 20 of anode 7 is designed such that when the anode 7 is inserted into the bore in the upper plate 61 of supporting member 6, and is engaged with the top surface thereof, the apex of projection 11 on the cup 1 will be spaced approximate 2 mm. from the top surface of the cathode 8.

The anode 7 is connected at its top end to a positive terminal of an external electric power source. An aqueous solution containing, for example, 4% by weight of hydrochloric acid may be used as the electrolyte 10.

By virtue of the aforesaid structure, a current of about 4 amperes at 12 volts may be caused to flow for 3 to 10 seconds, thereby subjecting the apex of projection 11 of the cup 1 to selective anodic dissolution. Minute holes prepared according to this technique were of a substantially circular shape, having a diameter of 0.03 to 0.09 mm. and smooth peripheral edges.

FIG. 4 shows graphically the relationship between the diameter of a minute hole formed according to the present invention and the duration of electrolysis. In FIG. 4, the ordinate represents the diameter in mm. of the hole while the abscissa represents the duration of electrochemical machining in seconds. The circles (o) on the resulting plot represent the average diameter of 10 minute holes for a particular duration. Lines extending vertically from the circles (o) represent the variation in diameter of the minute holes obtained from respective electrochemical machining samples. As may be appreciated from FIG. 4, minute holes having desired diameters may be obtained by suitable selection of the duration of electrolysis.

Obviously, numerous modifications and variations of the present invention are possible in light of the above teachings. It is therefore to be understood that within the scope of the appended claims, the invention may be practiced otherwise than as specifically described herein.

We claim as our invention:

1. A process for making a minute hole in the wall of a metal article, comprising the steps of:

forming a depression in the wall of a metal article at a localized spot on one of the surfaces of said wall, said depression having a depth exceeding the thickness of said wall and having a projection with an apex extending from the other surface of said wall;

positioning said apex of said projection formed on said other surface of said wall in an opposed spaced relationship to a cathode within an electrolyte; and introducing an electric current between said projection, which serves as an anode, and said cathode until said apex of said projection is dissolved to form a minute hole in said wall.

2. A process according to claim 1, wherein said metal article comprises a metal selected from the group consisting of steel, aluminum and stainless steel.

3. A process according to claim 1, wherein said depression forming step comprises the step of pressing said one surface of said wall with a punch having a conical tip.

4. A process according to claim 3, wherein said conical tip of said punch forms an angle of approximately 45°.

5. A process according to claim 1, wherein said depression forming step comprises the step of impacting a minute ball against said one surface of said wall.

6. A process according to claim 1, wherein said cathode comprises a substantially flat apex placed in an opposed relationship to said apex of said projection of said other surface of said wall.

7. A process according to claim 1, wherein the thickness of said wall of said metal article is not greater than 0.3 mm.

8. A process according to claim 1, wherein said depression forming step comprises the step of impacting a high pressure fluid against said one surface of said wall.

* * * * *